3,064,721
EVAPORATORS FOR PRODUCING A
SUPERSATURATED SOLUTION
Johan F. Witte, Amsterdam, Netherlands, assignor to
Werkspoor N.V., Amsterdam, Netherlands, a company
of the Netherlands
Filed May 4, 1960, Ser. No. 26,755
Claims priority, application Netherlands May 9, 1959
3 Claims. (Cl. 159—2)

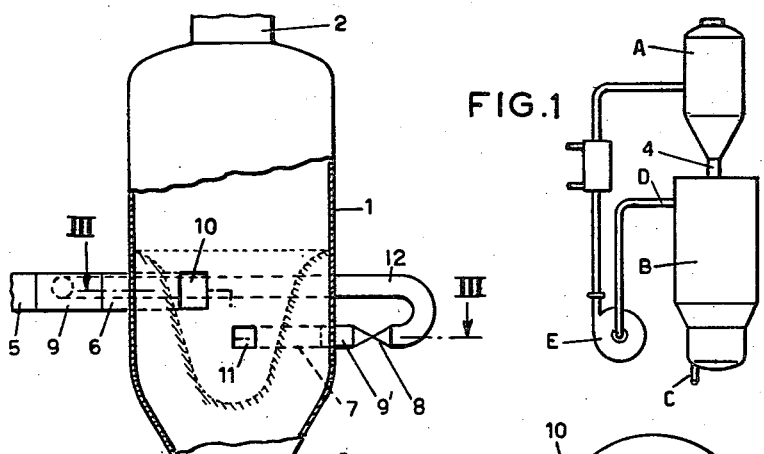
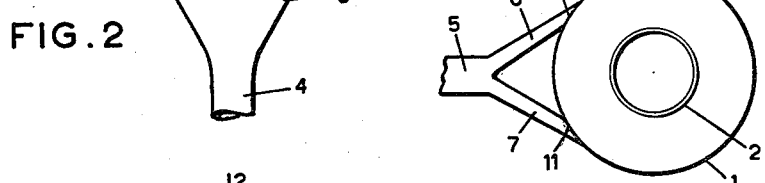
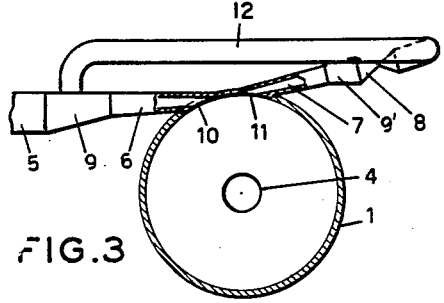
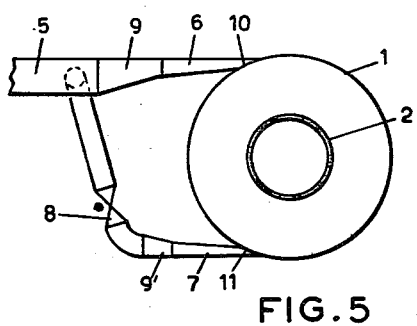

The invention relates to an evaporator for producing a supersaturated solution and consisting of a vertical vessel having substantially circular cross-sections, which vessel has an outlet orifice for the vapour at the top end and a discharge orifice for the supersaturated liquid at the base, an inlet orifice for the liquid to be concentrated being provided in the peripheral wall of the vessel.

When such an evaporator operates as an expansion evaporator, a pressure is maintained in the vessel which is lower than the pressure of the saturated vapour corresponding to a temperature at which the liquid enters the vessel. Owing to this, a part of the liquid conveyed into the vessel will evaporate and be cooled down, since the heat required for evaporation is withdrawn from the liquid itself. So that the desired low pressure may be maintained in the vessel, the vapour evolved is carried away and when the state of equilibrium is reached in the vessel the liquid which leaves the vessel will have the boiling temperaure belonging to the pressure maintained in the vessel.

When the solution is evaporated, it is given a higher concentration and, moreover, owing to the fall in temperature which the liquid in the evaporator suffers, the saturation concentration, and therefore the maximum quantity of said substance which can be dissolved at this lower temperature, may be given a different value which, in most solutions, is lower than the saturation concentration of the solution at the temperature at which the solution enters the evaporator.

If the solution is fed to the evaporator at a concentration which is not lower, or only a little lower, than the saturation concentration, it is possible, owing to the evaporation process and the fall in temperature during evaporation, for the liquid which is carried away from the evaporator to be supersaturated and therefore to retain more dissolved substance than may be in solution after equilibrium at the temperature of the liquid. If the supersaturation of the liquid in the evaporator is kept below a certain limit, a stream of supersaturated liquid can be drawn off continuously from the evaporator, i.e. liquid in which even the excess of solid substance in relation to the saturation concentration is still present wholly or partly in the dissolved state. During normal operation of the evaporator, the supersaturated liquid discharged generally contains small quantities of solid substance, which are suspended like crystal nuclei in the solution.

In order to prevent the excess of solid substance which is contained in the solution possibly being deposited together with the crystal nuclei on the inside wall of the evaporator vessel or on the internal parts thereof, special demands have to be made of the material of which the evaporator is made, the nature of the wall surface and the shape of the internal parts. As a solution has a preference for giving up its supersaturation with the solid substance with which the liquid is supersaturated the deposits on the wall and the internal parts of the vessel will continually increase, whereby the progress of the process in the evaporator will be seriously impaired in the long run.

In order to avoid these deposits, evaporators of various designs have been proposed, for example an evaporator into which the liquid is introduced centrally in the upward direction to a point some distance below the level of the liquid present in the vessel, an evaporator with tangential feed of the liquid to be concentrated just below the level thereof and an evaporator with an annular chamber for the supply of the liquid. In all these constructions, however, the permissible supersaturation is rather limited.

The object of the invention is so to design the evaporator that a higher supersaturation can be permitted and, according to the invention, at least two pipes for supplying the liquid in opposite directions are connected tangentially to the peripheral wall of the vessel. Owing to this method of supplying the liquid, the liquid mass present in the evaporator is given a rotary motion, so that the surface of the liquid assumes the shape of a cup without a depression continuing into the discharge pipe being formed. The deposits formed on the wall will be entrained by this rotating liquid mass as soon as they have grown to a certain size.

Even with a single tangential inlet for the liquid to be concentrated, the rotation of the liquid in the evaporator may be such that the depression does not continue into the discharge pipe, but in that case the rotation is greatly affected by small variations in the temperature of the liquid introduced, by a change of the average level of the liquid in the evaporator and by other factors. With the use according to the invention of at least two oppositely directed tangential inlets, the operation of the evaporator has proved to be less sensitive to temporary changes in the level, the admission temperature of the liquid and other factors.

The invention will be described in detail with reference to the drawing with the aid of a number of embodiments. In the drawing:

FIG. 1 is a diagram of a crystallization apparatus comprising an evaporator according to the invention and a crystallizer;

FIG. 2 is a vertical view on a larger scale of an evaporator, which is shown partly in section;

FIG. 3 is a horizontal section on the line III—III in FIG. 2, and

FIGS. 4 and 5 are plan views of two other forms of construction of the evaporator.

In FIG. 1, A is an evaporator in which a supersaturated solution is produced by evaporation of the mother liquor. This supersaturated solution passes through the pipe 4 into the crystallizer B, from which the crystalline mass formed is discharged at C and the mother liquid is returned to the evaporator A at D by means of a pump E.

The evaporators illustrated in the drawing take the form of a vertical vessel 1 of circular cross-section, which vessel has an outlet orifice 2 for the vapour at the top end and is provided with a conical base 3 to which a discharge pipe 4 for the concentrated liquid is connected. The liquid to be concentrated by evaporation is supplied through a pipe 5, which branches, so that there are two inlets 6 and 7 in the cylindrical part of the vessel. These two inlets are tangential but are directed oppositely to one another. The inlet 7 is provided with a regulating valve 8. The two inlets have together a smaller passage area than the supply pipe 5 and are each connected to pipe 5 and 12 respectively by a transition tube 9 and 9' respectively.

The narrowing of the passage areas of the tubes 9 and 9' and of the inlets 6 and 7 is such that a static pressure difference occurs between the liquid in the supply pipe 5 upstream of the transition tube 9 and the liquid at the mouths 10 and 11 of the inlets 6 and 7. This pressure difference slightly exceeds the difference between the pressure at which liquid entering the vessel at 10 and 11 boils at the temperature of the entering liquid and the pressure prevailing in the vessel when the smallest quantity of liquid is supplied for which the evaporator is designed. The required static pressure difference between liquid in the supply pipe and liquid at the mouths of the inlets can be determined by calculating the increase of the static pressure with reduction of area at the inlet mouths, taking into account the increase of the average rate of flow at the mouths of the inlets due to partial evaporation which reduces the average density of the liquid. From the above condition, it follows that the average rate of flow at the mouths 10 and 11 should be higher when the pressure in the evaporator is higher, since in general the drop in temperature required for obtaining a certain degree of supersaturation varies slightly with the temperature, whereas the pressure at which the liquid boils generally increases more than linearly proportional to the temperature.

The size of the deposits on the wall of the evaporator, these deposits being pushed off by the rotating liquid mass, is dependent on the degree of supersaturation and on the speed of rotation of the liquid. So that a certain speed of rotation may be obtained, the mouths 10, 11 of the two inlets 6, 7 have different cross-sections and the outflow velocity of one of these inlets can be regulated if required by means of the valve 8.

In order to prevent the spraying up of droplets at the surface of the liquid, the mouths 10, 11 of the liquid inlets are disposed at different heights. The most favorable results as regards spraying up and likewise as regards the limitation of deposits on the inner wall of the evaporator vessel are obtained when the average level of the rotating liquid mass in the vessel is kept just below the upper inlet orifice 10, the place of contact between the level and the wall adjusting itself to a few decimetres above said inlet orifice.

As will be seen from FIG. 4, the supply pipe 5 may also branch symmetrically into the two inlet pieces 6 and 7.

In the form of construction according to FIG. 5, the inlet orifices 10 and 11 are arranged approximately diametrically opposite one another in the wall of the vessel.

When an expansion evaporator according to the invention was used for producing a supersaturated solution of common salt at temperatures of 45–110° C. and a supersaturation of up to 9 grams per litre, Monel with a maximum surface of roughness of 1μ being selected as construction material for the evaporator, it was found that lump-shaped deposits of common salt were formed on the inner wall of the evaporator vessel, mainly in the annular zone at the place where the curved surface of the liquid contacts the wall of the vessel, which deposits, however, were detached from the wall before they reached such a size that they would have blocked the outlet. Deposition did not occur either in the supply pipes, which were made of ingot steel, or in the transitional portions between the supply pipes and the inlets, or in the transitional portions leading from the inlets into the evaporator vessel.

It has been found that the evaporator according to the invention, where the size of the vapor oulet and the height of the spray chamber is concerned, corresponds to the same conditions as a normal cyclone vapour separator, so that the supersaturated solution can be obtained in a rather small space. Owing to this, the number of crystal nuclei which are formed in the supersaturated solution can be restricted.

What is claimed is:

1. Evaporator for producing a supersaturated solution comprising a vertical vessel having a portion whose wall is cylindrical, a vapor outlet orifice formed at the top end of said vessel, a saturated liquid discharge orifice formed at the base of the vessel, two inlet orifices of different passage areas provided in the cylindrical wall of the vessel for entry of liquid to be concentrated, and two pipes for supply the liquid, each of said pipes being connected to one of said inlet orifices and tangentially to said cylindrical wall to inject the liquid to be concentrated into the vessel in two counter-rotating directions.

2. Evaporator for producing a supersaturated solution comprising a vertical vessel having a portion whose wall is cylindrical, a vapor outlet orifice formed at the top end of said vessel, a saturated liquid discharge orifice formed at the base of the vessel, two inlet orifices of different passage areas provided in the cylindrical wall of the vessel for entry of liquid to be concentrated, the larger inlet orifice being located at a higher level than the smaller inlet orifice, and two pipes for supplying the liquid, each of said pipes being connected to one of said inlet orifices and tangentially to said cylindrical wall of the vessel to inject the liquid to be concentrated into the vessel in two counter-rotating directions.

3. Evaporator for producing a supersaturated solution comprising a vertical vessel having a portion whose wall is cylindrical, a vapor outlet orifice formed at the top end of said vessel, a saturated liquid discharge orifice formed at the base of the vessel, two inlet orifices of different passage areas provided in the cylindrical wall of the vessel for entry of liquid to be concentrated, and two pipes for supplying the liquid, each of said pipes being connected to one of said inlet orifices and tangentially to said cylindrical wall of the vessel to inject the liquid to be concentrated into the vessel in two counter-rotating directions, each of said pipes having an upstream portion which narrows toward the inlet orifice.

References Cited in the file of this patent

UNITED STATES PATENTS

| | | |
|---|---|---|
| 2,424,205 | Otto | July 15, 1947 |
| 2,906,607 | Jamison | Sept. 29, 1959 |

FOREIGN PATENTS

| | | |
|---|---|---|
| 18,130 | Great Britain | 1905 |
| 765,293 | France | June 5, 1934 |